July 24, 1962 W. E. BRAINARD 3,045,510
MACHINE SLIDE POSITION ERROR SENSING
AND COMPENSATING MECHANISM
Filed Dec. 14, 1959 3 Sheets-Sheet 1

INVENTOR.
Wallace E. Brainard
BY
Attorney

INVENTOR.
Wallace E. Brainard

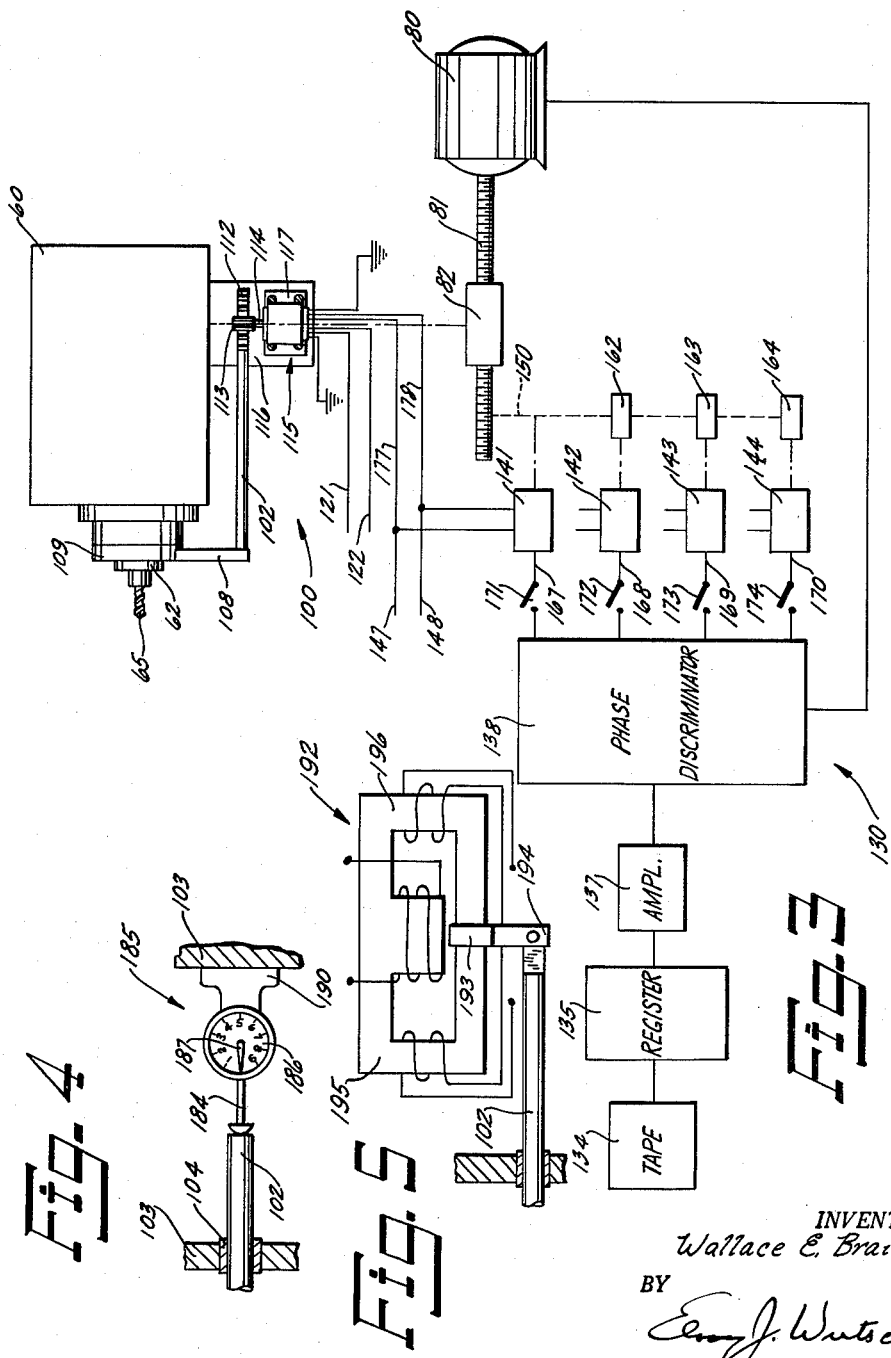

United States Patent Office 3,045,510
Patented July 24, 1962

3,045,510
MACHINE SLIDE POSITION ERROR SENSING
AND COMPENSATING MECHANISM
Wallace E. Brainard, Milwaukee, Wis., assignor to
Kearney & Trecker Corporation, West Allis, Wis.,
a corporation of Wisconsin
Filed Dec. 14, 1959, Ser. No. 859,331
15 Claims. (Cl. 77—5)

The present invention relates generally to precision positioning systems and more particularly to a mechanism which is automatically operable to apply a correction factor to the positioning system of a movable member of a machine tool to compensate for the expansion and contraction of the movable member due to temperature variations in the components of the movable member.

It is a general object of the present invention to proside a mechanism for increasing the accuracy of a machine tool.

Another object of the present invention is to provide a mechanism which senses a displacement of an operating point of a movable machine member due to an expansion or contraction of the member and automatically operates to signal such displacement to the positioning system for the member so that the positioning system will operate to compensate for the displacement which has occurred in the movable member.

Another object of the present invention is to provide a mechanism for the movable member of a machine tool which reacts to a dimensional change of the movable member to apply a correcting factor to the positioning system of the movable member to compensate for the amount of dimensional change in the member for the purpose of accurately maintaining one end of the member in a desired position.

Another object of the present invention is to provide a mechanism which senses a change in position of the operating end of a tool carrying member and operates in response to such change to effect a correction motion in a machine slide member to compensate for the change that has occurred in it.

Still another object of the present invention is to provide a temperature stable bar member which is associated with the operating end of a tool carrying member so as to reflect a change in the position thereof and which operates to actuate a corrective transducer to develop an electrical output which is proportional to the change with the electrical output being used to effect a correction movement in a machine slide member for the purpose of compensating for the change in position of the operating end of the tool carrying member.

A further object of the present invention is to provide mechanism which is operable to sense a displacement of the operating end of a machine tool member from an established position and having means for indicating the amount of such displacement.

Still another object of the present invention is to provide mechanism which is simple in construction but extremely accurate in operation for sensing and compensating for the displacement of the operating end of a machine tool member from an established position.

Another object of the present invention is to provide mechanism to indicate the displacement of the operating end of a machine tool member due to the expansion and contraction of the member when subjected to temperature variations.

According to this invention, the improved sensing and compensating mechanism comprises a bar formed of a material that is relatively stable under temperature variations. One end of the bar is connected to the operating end of a machine tool member, such as a spindle carrying quill, so that a displacement of the operating end of the member from an established position will effect a proportional movement of the bar. The movement of the bar is utilized to actuate a mechanism which develops an output that is proportional to the movement. Such output may be used to operate visual indicating means for indicating the amount of such displacement so that a correction may be applied to a machine slide to compensate for the displacement. The invention also includes automatic means operative to signal the displacement of the operating end of a machine tool member to a machine slide positioning system so that the positioning system will operate to move the machine slide to compensate for the displacement of the operating end of the member. In such case the movement of the bar may be used to actuate a corrective transducer to develop an output which is directed to the positioning system associated with a machine slide so that the positioning system will operate to move the machine slide to compensate for the displacement of the operating end of the machine member from an established position.

The foregoing and other objects of this invention, which will become more fully apparent from the following detailed description, may be achieved by means of the exemplifying apparatus depicted in and set forth in this specification in connection with the accompanying drawings, in which:

FIG. 3 is a diagrammatic view illustrating the position error sensing and compensating mechanism of the present invention connected to operate with a positioning control system employed with the machine tool for automatic positioning of the spindle head in response to recorded information;

FIG. 4 is a detail view of the bar sensing mechanism employed in conjunction with an indicator mechanism for visually indicating the amount of position error occurring in the tool carrying end of the spindle due to expansion and contraction induced by reason of temperature variations; and FIG. 5 is a detail view of the bar sensing mechanism shown employed in conjunction with a linear transducer.

Figure 1:
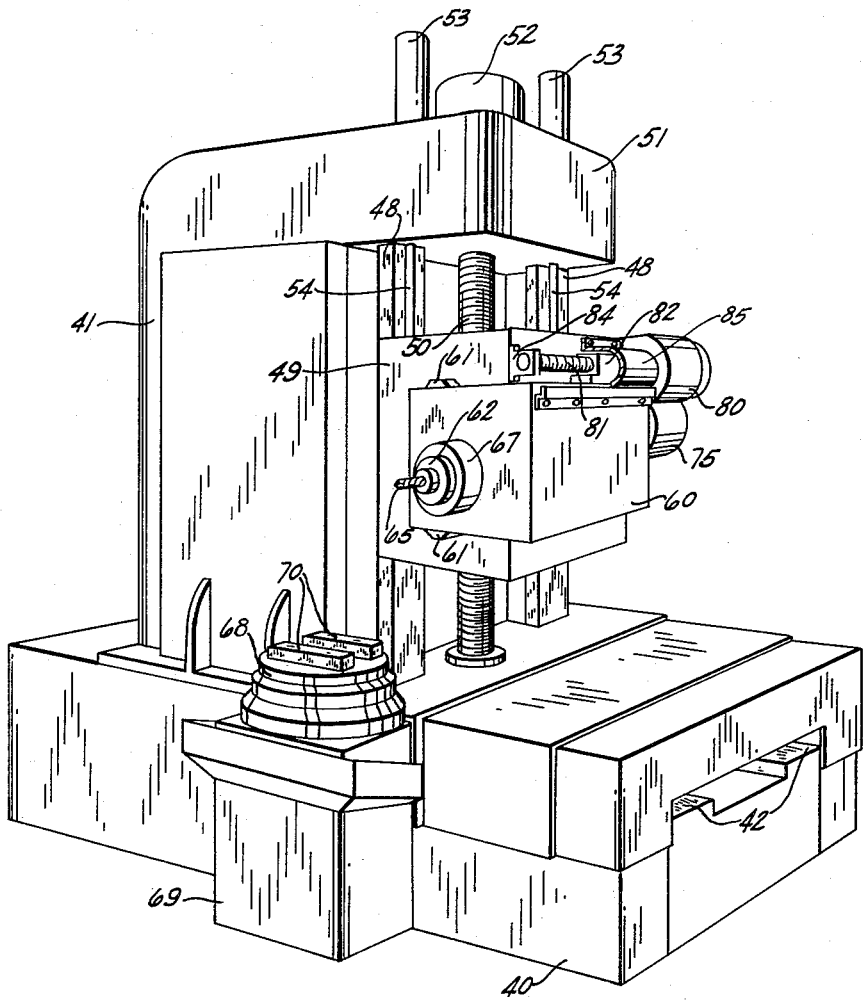
FIGURE 1 is a perspective view of a machine tool incorporating the features of the present invention.

Reference is now made more particularly to the drawing and specifically to FIG. 1 thereof illustrating a machine tool incorporating the features of the present invention. The machine generally comprises a bed 40 which slidably supports an upstanding column 41. To this end, the bed 40 is provided with horizontal ways 42 which are engaged by complementary ways (not shown) formed at the bottom of the column 41 to support the column for sliding movement along the length of the bed 40.

The column 41 is provided with vertical ways 48 for engagement by complementary ways (not shown) formed on a saddle 49 for slidably supporting the saddle in a vertical path of travel. Vertical movement of the saddle 49 in either direction is effected by rotating a screw 50 which is in threaded engagement with a nut (not shown) that is fixed to the saddle 49. The screw 50 is rotatively supported by the column 41, being journalled at its upper end in a cap 51 that is secured to the top of the column 41 and which extends from the column beyond the ways 48 for receiving the screw 50. The lower end of the screw 50 is journalled in a suitable bearing (not shown) that is attached to the column 41 beneath the top of the bed 40. The screw 50 may be rotated in either direction by a motor 52 mounted on the top of the cap 51 and connected to rotate the screw 50 for actuating the saddle 49 in its path of travel by power. A pair of hydraulic piston and cylinder mechanisms 53 are mounted on the top of the cap 51 and are connected to the saddle 49 by connecting rods 54 and are arranged in a well known manner to counterbalance the weight of the saddle 49 and its associated mechanisms.

A spindle head 60 is carried by the saddle 49 and is provided with horizontal ways 61 which engage complementary ways formed within the saddle 49 for supporting the spindle head 60 for a sliding cross fed movement in a horizontal path transverse to the direction of travel of the column 41. It is therefore apparent that the column 41, the saddle 49 and the spindle head 60 are each supported for movement in three mutually transverse paths of travel. The spindle head 60 rotatably supports a spindle 62 that is adapted to carry a tool 65 to rotate with the spindle 62 for performing a work operation. The spindle 62 is rotatably supported in a quill 67 that is horizontally mounted within the spindle head 60.

The spindle 62 supports a tool 65 in position to operate upon a workpiece (not shown) located on a rotary index table 68 which is mounted on the top of a pedestal 69 that is secured to the front face of the bed 40. In the illustrated embodiment, the rotary table 68 is adapted to receive the workpieces attached to pallets (not shown) which are transported to the tables 68 onto a pair of rails 70 by a suitable conveyor (not shown), and clamped to the rails so that the workpiece carried by the pallet will be positioned relative to the saddle and spindle head in position for the spindle head to be moved or adjusted to a desired position relative to the workpiece. However, it is to be understood that any conventional table may be provided with each individual workpiece being clamped thereto manually by the operator if so desired.

The spindle 62 is driven in its rotary movement by a motor 75 under the control of a servo mechanism (not shown) that is controlled automatically from recorded data or by manual manipulation of the electrical control system. The motor 75 is connected to drive a gear 76, shown in FIG. 2, and its associated spindle 62 through a transmission (not shown) in a well known manner.

Cross feeding movement of the spindle head 60 for effecting the feeding movement of the spindle 62 toward or away from the workpiece or to effect the positioning of the spindle relative to the workpiece is effected by a motor 80 which is energized through a servo mechanism that may be operated automatically in response to recorded data or by the manual manipulation of the electrical control circuit for controlling the rate and direction of rotation of the cross feed motor 80 to regulate the rate and direction of movement of the spindle head 60.

The motor 80 is operatively connected to rotate a screw 81 that is journalled in a recirculating ball bearing threaded nut 82 which is fixedly secured to the spindle head 60. The ends of the lead screw 81 are anchored in a pair of preloaded bearing brackets 84, one of which is shown, that are attached to the saddle 49. A cover 85 is secured to the saddle 49 and is formed to enclose the screw 81 and the nut 82 so as to exclude foreign matter from the screw and nut mechanism to avoid impairing its efficiency.

Figure 2:
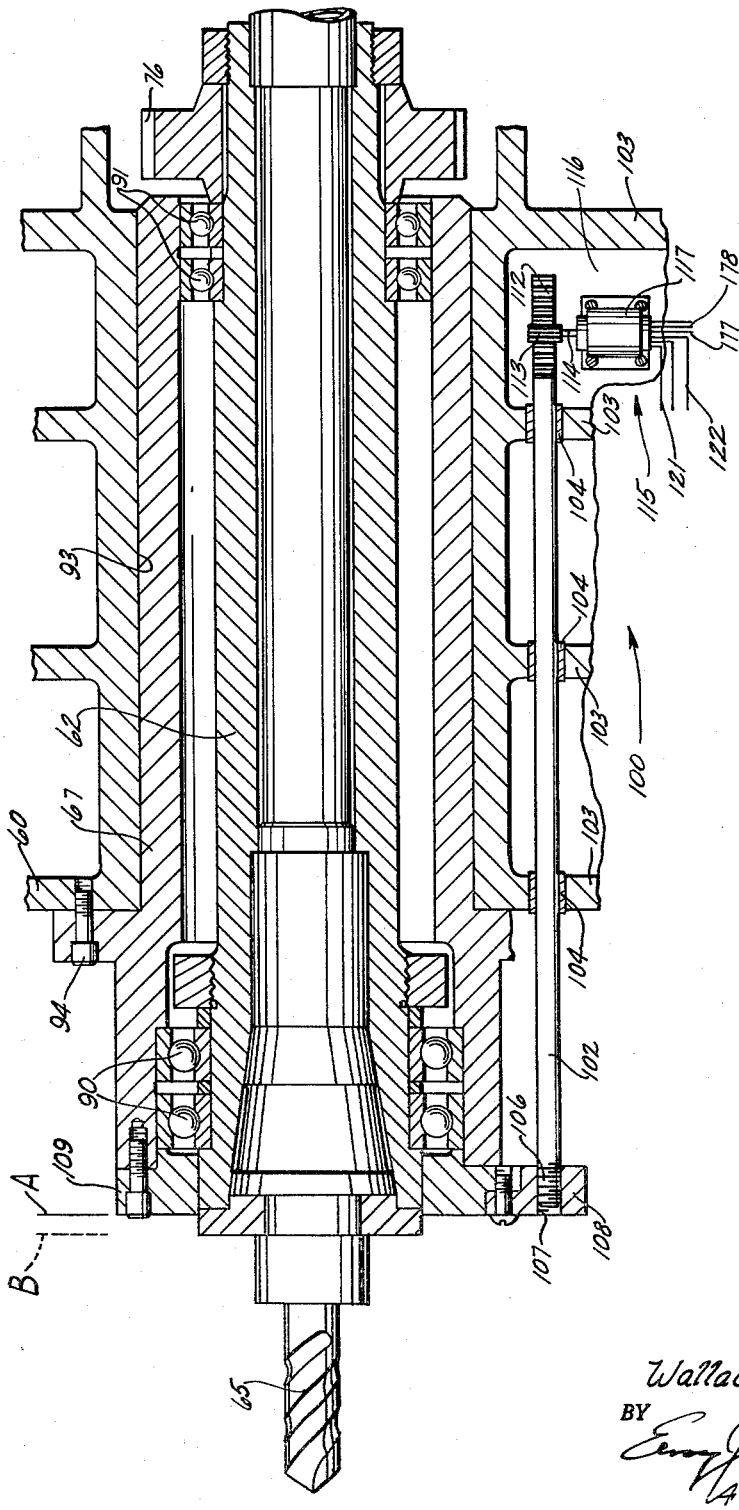
FIG. 2 is a detailed view, partly in side elevation and partly in vertical section showing the position error sensing mechanism of the present invention associated with the spindle carrying quill of the machine tool depicted in FIG. 1.

As shown in greater detail in FIG. 2, the spindle 62 is journalled in a quill 67 that is supported by the spindle head 60 for movement therewith. The spindle 62 is supported at its forward end by a pair of ball bearings 90 and at its rearward end by a pair of ball bearings 91. The gear 76 is keyed to the spindle 62 at its rearward end adjacent to the ball bearings 91, the gear 76 being connected to be driven by the motor 75 through a transmission (not shown) in a well known manner to effect rotation of the spindle at any one of a plurality of speeds selectively. The ball bearings 90 and 91 are disposed and mounted within the quill 67 and the latter is located within a bore 93 provided in the spindle head 60 with the quill being secured to the spindle head by screws 94.

When the machine tool spindle is rotated, its temperature may rise substantially as a result of the heat that is generated by the friction that develops in the various mechanical components of the machine tool spindle head, such as the bearings, gears and the motor. Such temperature variation results in an expansion and contraction in the length of the spindle structure by reason of its coefficient of expansion. This expansion and contraction operates to displace the tool carrying end of the spindle from an established position. In machine tools in which relative positioning between a tool carrying spindle and a workpiece is effected automatically the positioning movement is made with respect to an established reference plane. Thus, a precise relationship may be established between a workpiece and the tool carrying spindle. However, if the operating end or tool carrying end of the spindle is displaced from an established position by reason of its expansion or contraction, an error is introduced which is detrimental in automatic high precision types of work operations.

For example, it may be assumed that a tool carrying spindle is to be positioned relative to a workpiece by movement of the spindle head and such movement will be effected automatically by means of a positioning control system associated with the spindle head. The command information to the positioning control system to effect a movement of the spindle head is always related to a reference plane so that the exact position of the spindle head at any particular time is established in relation to this reference plane. Therefore, if the spindle head is moved a distance which is "X" number of inches from an established reference plane, the operating end or tool carrying end of the spindle will be located in a plane "A." However, if, due to temperature variation in the spindle head structure, the spindle has expanded, the operating end of the spindle will not be in the desired plane "A" but will actually be in a plane "B" which is a distance closer to the workpiece by an amount equal to the displacement of the operating end of the spindle by reason of its linear expansion as a result of the temperature rise. In this case, the work operation performed on the workpiece would be in error in an amount equal to the distance between the desired plane "A" and the actual plane "B." In order to compensate for the displacement of the operating end of the spindle from an established position, due to temperature variation, a displacement error sensing and compensating mechanism, generally identified by the reference numeral 100, has been provided, as shown in FIG. 2.

The position error sensing and compensating mechanism 100 comprises a bar 102 that is formed of a material that has an extremely low coefficient of expansion to render it relatively stable under temperature variations. It has been found that a suitable material for the bar 102 is a material known as Invar which has a high nickel content, the ratio being approximately 64% iron and 36% nickel. This material possesses an extremely small coefficient of linear expansion, about 0.0000004 per degree centigrade. The bar 102 is slidably supported in the spindle head 60 and extends from the outer face of the spindle rearwardly through suitable openings provided in webs 103 that are integrally formed with the spindle head structure. The bar 102 is supported for axial movement in bushings 104 that are disposed within the openings provided in the webs 103. The outer end 106 of the bar 102 is threaded and is engaged in a threaded opening 107 provided in a bracket 108. The bracket 108 is attached to a spindle locking collar 109 that is secured to the axial end surface of the quill 67 by suitable screws. The bracket 108 extends radially outwardly from the peripheral surface of the locking collar 109, as shown in FIG. 2. With this arrangement the outer end of the bar 102 is approximately in the same plane as the axial outer end face of the spindle 62. It is readily apparent that the bar 102 will move with the spindle head 60 when the head is moved in a positioning movement but its position relative to the spindle is not affected by such movement. However, with the bar 102 attached to the locking collar 109, as shown, any displacement of the forward or operating end of the quill 67 and its associated spindle 62 from the reference plane due to the linear expansion of the spindle structure and its associated quill 67 will impart a longitudinal movement to the bar 102 in an amount which is equal to the amount of the displacement.

As previously stated, the bar 102 extends into the spindle head 60 with its rearwardly extending end being provided with a gear rack 112. The gear rack 112 has meshing engagement with a pinion 113 that is secured to the extending end of the rotor shaft 114 of a differential synchro 115. The differential synchro 115 is fixedly mounted on a wall 116 of the spindle head 60 by means of a bracket 117 which is fastened to the wall by suitable screws and is positioned so that the axis of its rotor shaft 114 and the gear 113 will be in a plane that passes through the center of the spindle head actuating nut 82. Thus, the position of the differential synchro 115 is fixed in alignment with the nut 82 along the length of the spindle 62 and the synchro operates to establish the position of the operating end of the spindle and quill. The nut 82 is the reference point from which the movement of the spindle head 60 and its associated elements occurs and a temperature variation which effects expansion or contraction of the spindle head structure will not affect the alignment that has been established between the differential synchro 115 and the nut 82. This is true by reason of the fact that since both the differential synchro 115 and the nut 82 are fixed to the spindle head 60, with the axis of the rotor of the synchro 115 being located in a plane which passes through the center of the nut 82, any expansion or contraction in the spindle head structure due to temperature variations, will affect each in the same manner and the relative position established between the synchro and the nut will not be affected. When the nut 82 is driven by rotation of the screw 81 to move it to a desired position, the new location of the nut 82 is accurately represented by the recorded data but the operating end of the spindle may be displaced from the location indicated by the recorded information due to the expansion or contraction of the spindle head structure. Such displacement will therefore be relative to the nut 82 and the differential synchro 115 so that the latter may be employed to measure the displacement and apply the correcting voltage.

Since the bar 102 is relatively stable and will not expand significantly with a temperature rise, a linear expansion of the spindle structure due to a temperature rise in the structure will be reflected in a movement of the bar 102 and its cooperating gear rack 112 with the displacement of the forward end of the quill 67 which will operate to rotate the pinion 113 and thereby rotate the rotor of the differential synchro 115. The arrangement is such that one-tenth of one inch of axial movement of the bar 102 will effect rotation of the rotor of the synchro 115 one full revolution. Therefore, if the stator field of the synchro 115 is energized from a source through conductors 121 and 122 and the rotor of the synchro rotated by movement of the bar 102, the voltage produced by the differential synchro 115 will vary in accordance with the angular position of its rotor to the movement of the bar.

The machine, shown in FIG. 1, is provided with a control system 130 for automatically effecting positioning o fthe spindle head 60 from recorded data. As diagrammatically illustrated in FIG. 3, the control system 130 for controlling the operation of the motor 80 so as to effect the position of the head 60 comprises a source of recorded information which is diagrammatically represented as a tape and associated tape reader 134. The tape 134 is actuated to produce a signal which indicates the desired position of the spindle 62 and this signal is transmitted to a register 135 where it is stored and converted into a command voltage for indicating the desired final position of the quill 67 and its associated spindle 62. When axial positioning of the spindle 62 occurs, the command voltage from the register 135 is directed to a voltage amplifier 137 and thence into a phase discriminator 138. The phase discriminator operates to compare the command input voltage with the control voltages, which indicate the position of the spindle head 60 at any particular time, and the net or error voltage is then utilized and directed to the motor 80 to effect its operation in a positioning action. When the phase of the command voltage and the phase of the control voltages are in correspondence a null occurs and the operation of the motor will stop and the positioning of the spindle head 60 will have been effected as directed by the command input or tape.

In the particular showing made, the control voltages to the phase discriminator 138 are obtained from four synchros 141, 142, 143 and 144. These synchros are of a type having poly-phase stator windings and a single phase rotor winding. As shown, the synchro 141 which is designated as the fine synchro, receives a reference voltage from a source (not shown) through conductors 147 and 148 and has its rotor mechanically connected to be driven by the screw 81. Such mechanical connection of the rotor to the screw is represented by the broken line 150. The lead of the screw 81 is such that one revolution of the screw will equal one-tenth of an inch of movement of the spindle 62. With a one-to-one connection effected between the screw 81 and the rotor of the synchro 141, the rotor of the synchro 141 will make one complete revolution for every revolution of the screw 81 and one revolution of the rotor will therefore represent one-tenth of an inch of axial spindle movement. The synchros 142, 143 and 144 are designated as coarse synchros with the synchro 142 representing one inch of spindle movement, that is, one revolution of its rotor represents one inch of axial spindle motion, and, therefore, its rotor is mechanically connected to be driven from the screw 81 with a ten-to-one reduction being effected through a reduction transmission represented by the box 162.

The coarse synchro 143 is the ten inch synchro, wherein its rotor is mechanically connected to be driven through a gear reduction transmission represented by the box 163, so that a further ten-to-one ratio is effected and therefore one revolution of its rotor will represent ten inches of axial spindle motion. The remaining synchro 144 is the hundred inch synchro with its rotor being driven through a reduction transmission represented by the box 164 wherein a further ten-to-one reduction is effected so that one revolution of its rotor will represent one hundred inches. The rotor windings of each of the synchros 141 to 144, inclusive, are electrically connected to the phase discriminator 138, such connections being represented by the lines 167 to 170, inclusive. In each line there is an automatically operated disconnect switch 171, 172, 173 and 174, and these switches are automatically closed, successively, to individually connect the synchros to the phase discriminator 138 as the spindle head 60 progresses in its path of travel. The switches 171, 172, 173 and 174 are also automatically opened, successively, to individually disconnect the synchros from the phase discriminator 138 as the control signal (voltage) of each synchro moves into correspondence with the command signal in the phase discriminator so that each synchro will operate, successively, within its limits, to transmit a position control signal to the phase discriminator 138. Thus, when the positioning control system 130 is operated, the disconnect switch 174 will be closed to connect the synchro 144 to the phase discriminator 138, while the switches 171, 172 and 173 are maintained in an open condition to disconnect the synchros 141, 142 and 143, respectively, from the discriminator 138. The two signals, that is the command signal from the record and the control signal from the synchro 144, to the phase discriminator are resolved and an error voltage is developed to energize the motor 80 for effecting a positioning movement of the spindle head 60. When the phase of the command signal and the phase of the control signal from the synchro 144 are in coincidence a controller (not shown) operates to open the switch 174 and close the switch 173 thereby transferring the control to the synchro 143. This action continues until the fine synchro 141 is connected to the phase discriminator 138. When the phase of the control signal from the fine synchro 141 and the phase of the command signal from the record are in coincidence no error signal is developed and a null obtained, thereby stopping the operation of the motor 80.

In operation, the position control mechanism 130 operates to effect movement of the spindle head 60 to the position indicated by the command signal received from the record 134. For example, it will be assumed that the record 134 is issuing a command signal for effecting 45.78 inches of movement. As previously mentioned, the synchros 141 to 144, inclusive, are energized by a reference voltage through conductors 147 and 148. At this time the controller (not shown) operates to close the switch 174 thereby connecting the synchro 144 to the phase discriminator 138 and also opens the switches 171, 172 and 173 to disconnect the synchros 141, 142 and 143 from the phase discriminator. The error voltage obtained through the operation of the phase discriminator 138 will be transmitted to the motor 80 to effect a movement of the spindle head 60. Since the synchro 144 is the hundred inch synchro its rotor will rotate four-tenths of a revolution to indicate the forty inches of axial spindle head motion. When the rotor of the synchro 144 has been rotated four-tenths of a revolution the phase of the signal from the synchro and the phase of the command signal will be in coincidence and at this time no error signal would be obtained and the motor 80 would stop. However, at this time the controller (not shown) is operated to open the switch 174 and close the switch 173 thereby disconnecting the synchro 144 and connecting the synchro 143 to the phase discriminator 138. With the synchro 143 now connected to the phase discriminator 138 it will transmit a position control signal to the phase discriminator, the phase of which is not coincident with the phase of the command signal, and therefore, an error signal will be obtained to maintain the motor 80 energized. Since the synchro 173 is the ten inch synchro, when its rotor is rotated five-tenths of a revolution, which indicates the additional five inches of axial spindle head motion, the phase of the two input signals to the phase discriminator are again in coincidence and the controller (not shown) will again operate to open the switch 173 and close the switch 172 so that a position control signal input to the phase discriminator 138 will be obtained. The phase of the position control signal input from the synchro 142 will not be in coincidence with the phase of the command signal input and an error signal will still be obtained to maintain the motor 80 energized to continue the movement of the spindle head 60. Since the synchro 142 is the one inch synchro, when its rotor is rotated seven-tenths of a revolution, which is representative of seven-tenths of an inch of spindle head movement, the phase of the signal input from synchro 142 and the command signal input will be in coincidence and a null obtained. However, at this time the controller (not shown) operates to open the switch 172 and close the switch 171 to transfer control to the one-tenth inch synchro 141. Since at this time the spindle head 60 has not as yet been moved the full 45.78 inches, but only 45.70 inches, the control signal input from the synchro 141 and the command signal input to the phase discriminator 138 will not be in phase coincidence and an error signal will still be obtained to maintain the motor 80 energized to effect a movement of the spindle head 60 the final eight-hundredths of an inch. When the rotor of the synchro 141 is rotated eight-tenths of a revolution, which is representative of eight-hundredths of an inch of movement of the spindle head 60 the phases of the two input signals to the phase discriminator 138 will be in coincidence and no error signal will be obtained so that the motor 80 will stop and the spindle head 60 will have been moved the 45.78 inches as commanded by the record.

With the spindle head positioned, as commanded by the tape, the axial outer end face of the locking collar 109 of the spindle structure will be located in a plane represented by the solid line A, shown in FIG. 2, which position is the desired position. With this brief description of the operation of the positioning control mechanism 130 and its associated synchros 141 to 144, inclusive, it is believed that sufficient background has been given so that a general understanding of its operation has been presented and which is adequate for the understanding of the operation of the invention contained herein which will be subsequently described in connection with it.

It will now be assumed that the spindle structure of the spindle head 60 has grown longitudinally so that the nose or operating ends of the spindle 62 and quill 67 are displaced five-thousandths of an inch from an established position, due to a temperature rise within the spindle head. Therefore, when the position control mechanism 130 operates to effect 45.78 inches of movement of the spindle head 60, the axial outer face of the collar 109, when such movement has been effected, would not be in the desired plane, represented by the full line A, but will actually be in a plane represented by the broken line B, shown in FIG. 2, which is five-thousandths of an inch in advance of the desired location but which is shown greatly exaggerated in FIG. 2 for the sake of clarity. This variation between the desired position of the axial end face of the locking collar 109 and the actual position as represented by the broken line B introduces an undesirable error. Since a physical change in the spindle structure is not considered in preparing the recorded medium, no consideration is given to this change by the positioning control mechanism 130, when it operates to effect a positioning of the spindle head 60. It is this change that the mechanism 100 senses and automatically introduces a correcting factor into the positioning and control mechanism 130 to compensate for the physical change in the spindle structure and eliminates the errors which the longitudinal expansion of the spindle would introduce.

In describing the operation of the compensating mechanism 100 it will be assumed that the spindle head structure has expanded longitudinally to dislocate the forward or operating end of the quill 67 and its associated spindle 62 five-thousandths of an inch from the reference plane upon which the information on the record is based due to a temperature variation in the spindle and quill assembly. Since the bar 102 is relatively stable and not similarly affected by temperature changes, it will move this five-thousandths of an inch with the operating end of the quill 67 by reason of its connection to the locking collar 109. The gear rack 112, of course, will move with the bar 102 to effect a rotation of the pinion 113 which is not affected by the temperature change in the quill and spindle assembly because it is supported by the frame of the spindle head 60 in alignment with the reference point represented by the center of the nut 82. The five-thousandths of an inch of linear movement of the gear rack 112 will produce 18° of rotation of the pinion 113 to revolve the rotor of the differential synchro 115 a like amount which represents the five-thousandths of an inch of movement of the forward end of the quill 67.

With the stator of the differential synchro 115 energized by a source (not shown) through the conductors 121 and 122, the differential synchro 115 will produce a voltage whose phase will shift in accordance with the angular position of its rotor to indicate the position error of the operating end of the quill 67. This voltage is directed to the field of the stator of the fine synchro 141 through conductor 177 and 178. The voltage to the field of the stator of the synchro 141 will electrically rotate the stator field of the synchro 141 by an amount that represents the movement of the bar 102, which in this particular case is assumed as being five-thousandths of an inch. As previously stated, it is assumed that the command signal from the record to the phase discriminator 138 calls for 45.78 inches of movement of the spindle head 60, the synchros 144, 143 and 142 will operate as previously described to accomplish the 45.70 inches of movement.

In order to produce the final positioning of .080 of an inch of the spindle head 60, the rotor of the synchro 141 should rotate 288°. However, as described, the stator field of the synchro 141 has been rotated electrically 18° by operation of the synchro 115 to indicate the displacement of the forward end of the spindle 62 and the quill 67 from the reference plane as a result of the linear expansion due to a temperature rise of the members. Therefore, the phase of the voltage from the synchro 141 will be in coincidence with the phase of the command voltage after it has been rotated 270° to nullify the error voltage at this point and terminate the operation of the motor 80 for stopping the movement of the spindle head 60 after 45.775 inches of movement. In view of the fact that the linear expansion of the quill 67 and spindle 62 advanced their operating ends five-thousandths of an inch, the desired 45.78 inches of movement will have been obtained for accurately positioning the spindle and its associated cutter despite the expansion of the spindle and quill assembly.

Therefore, while the command input to the phase discriminator 138 called for a movement of 45.78 inches of the spindle head 60, the motor 80 will have operated to effect a movement of the spindle head 60 in the amount of 45.775 inches. However, since the linear expansion in the spindle structure has advanced the operating ends of the spindle 62 and quill 67 five-thousandths of an inch, the axial end face of the locking collar will now be positioned in the plane represented by the solid line A, shown in FIG. 2, which is the desired position. Thus, the displacement of the operating end of the spindle structure due to a temperature variation has been compensated for by the operation of the sensing and compensating mechanism 100 and the precise positioning of the spindle head into the desired position has been effected with the correction being imparted so as to modify the operation of the positioning control mechanism 130.

It is therefore apparent that the mechanism 100 not only operates to sense a physical change in the spindle carrying structure but also operates automatically to impart a corrective factor to the position control mechanism to compensate for the displacement of the operation of the spindle 62 from the reference plane that has occurred due to a temperature variation. With this mechanism the accuracy of the machine tool is maintained despite the dislocation of the operating end of the spindle 62 from the reference plane due to linear expansion and contraction caused by temperature variations. The mechanism demands no attention on the part of the operator for it effects the required correction automatically and it is capable of sensing all variations in the dimensional characteristics of the structure that it is associated with.

While the mechanism 100 has been described in conjunction with an axially movable spindle head structure that is power actuated for effecting a positioning of the tool carrying spindle, it is not necessarily confined to this relationship. For example, the spindle head 60 could be axially stationary and the relative position between a workpiece and a spindle could be effected by means of a movable table on which the workpiece would be carried. In this case the positioning control mechanism 130 and the associated synchros 141 to 144, inclusive, would be connected to the table power actuator. The voltage from the differential synchro 115 in this case would be used to apply the correcting factor to the table positioning control mechanism in the manner described so that a correct desired relationship would be established between the workpiece and the spindle.

In FIG. 4 an alternate form of the growth sensing mechanism is shown. As there shown, the rod 102, which is secured to the locking collar 109 at one end, as previously described, is shown as having its opposite end in engagement with the outer end of an actuating rod or shaft 184 of an indicator mechanism 185. The indicator mechanism 185 is provided with a dial 186 that is divided into ten divisions by suitable indicia with each division indicating a suitable fraction of an inch of movement as, for example, one one-thousandth of an inch. The indicator mechanism is provided with an indicating pointer 187 which is rotated by the axial movement of the shaft 184. The actuating shaft 184 is connected to the pointer 187 in a manner to be spring urged in a leftward direction by means of a spring (not shown), and upon a leftward movement of the shaft 184, the indicating pointer 187 will rotate in a clockwise direction, as viewed in FIG. 4. Thus, as the bar or rod 102 moves leftwardly, the shaft 184 by action of the spring (not shown) contained within the indicator mechanism 185 will follow the bar 102 to maintain engagement therewith and the indicator hand 187 will be rotated in a clockwise direction to indicate the amount that the bar 102 has been moved.

The indicator mechanism 185 is secured in a fixed position to the frame of the spindle head 60 by means of a bracket 190 which is secured to the web 103 of the spindle head by suitable screws (not shown). Thus, a displacement of the operating end of the spindle 62 due to the linear expansion of the spindle by reason of a temperature variation therein, will cause a leftward movement of the temperature stable bar 102, as viewed in FIG. 4, in an amount equal to the displacement of the operating end of the spindle and the rod 102 will move leftwardly, as viewed in FIG. 4, a like amount. The actuating shaft 184 of the indicator mechanism 185 will follow the axial movement of the rod 102 due to the action of the spring (not shown) which retains the end of the shaft 184 in engagement with the end of the rod 102. As the shaft moves leftwardly the indicator pointer 187 will rotate in a clockwise direction to indicate the amount of axial movement that has been imparted to the bar 102. Since the indica on the dial 186 of the indicator mechanism 185 is divided into ten divisions with each division representing one one-thousandth of an inch of movement, a direct reading may be obtained from the dial of the indicator 185 to show the amount of displacement that occurred in the forward end of the spindle structure from the reference plane. The mechanism illustrated in FIG. 4 is intended for use with a spindle head or other movable member where the operator effects the corrective positioning of the spindle head and therefore the spindle head in which this mechanism is to be incorporated will be provided with a suitable opening through which the operator may view the dial 186 of the indicator mechanism 185. In order to effect the required correction, the operator need only to read the dial to know how much the forward end of the spindle has been displaced from the reference plane and therefore he can readily compensate for this displacement in effecting an exact positioning of the spindle head by subtracting this reading from the dimension or the distance that the spindle head would be moved if no change had occurred in its dimension.

In FIG. 5 a linear transducer 192 is shown as being connected to be actuated by movement of the bar 102. In this showing the linear transducer 192 is employed for obtaining a voltage which is proportional to the movement and is shown for the purpose of illustrating another type of transducer which can be used in lieu of the differential synchro 115. As shown, the inner end of the bar 102 is connected to an armature or loop 193 of the linear transducer. By varying the position of the loop 193 either to the left or to the right from the center position that it occupies, as shown in FIG. 5, reduces the field in the nearest leg and increases the field in the other leg. Thus, the voltages induced in the coils of the legs will be unequal resulting in a voltage output which is the difference between the two induced voltages and the output will be in proportion to the loop displacement. To effect a displacement of the loop 193 the loop structure is provided with a bracket 194 which receives the inner end of the bar 102. Thus, an axial movement of the bar 102 to the left, as viewed in FIG. 5, which movement is induced by a linear expansion of the spindle structure due to temperature variations that produce a displacement of the operating end of the spindle 62 and quill 67, will operate to move the loop 193 to the left thereby reducing the field in the nearest leg 195 of the linear transducer, while increasing the field in the leg 196 thereof. The resulting output voltage from the transducer will be in proportion to the loop displacement. Since the loop 193 will move with the bar 102 the output voltage will be proportional to the movement of the bar 102.

Therefore when the bar 102 moves axially to the left one-tenth of an inch the loop 193 will also move to the left one-tenth of an inch and the resulting output voltage obtained may then be considered to represent one-tenth of an inch. This resulting output voltage may be directed to the control system 130 for modifying its operation to compensate for the displacement of the operating end of the spindle 62 from the reference plane. Since a resulting voltage output from the linear transducer 192 is proportional to the loop displacement, any movement of the bar 102 will result in an output voltage which is proportional to the movement. The linear transducer 192 when secured to the wall 116 of the spindle head 60 will be positioned so that a plane which passes through the center of the spindle head actuating nut 82 will also pass through the center of the loop 193 when it is in a centered position relative to the legs 195 and 196, as shown in FIG. 5. In this manner any linear expansion in the spindle head structure due to temperature variations will not affect the relationship established between the nut 82 and the linear transducer 192 and any movement of the bar 102 will reflect the amount of displacement occurring in the operating end of the spindle and quill from the reference point represented by the centered position of the loop 193 of the linear transducer 192.

Thus, three variations of the sensing mechanism have been shown, one of which is automatic in effecting the required correction and the other of which merely indicates the amount of displacement occurring. In illustrating the automatic correction version a particular type of transducer has been shown. However, such a transducer may take a variety of forms such as, for example, a linear differential transformer, a strain gauge, or a variable induction or capacitor, such as is normally employed in an A.C. bridge, and other similar types of transducers may be used instead of the differential synchro mechanism 115 which is shown. It has been found preferable, but not absolutely necessary, to have the transducer employed develop a code which is similar to the code developed by the positioning control system. Thus, in machine tools in which an incremental type of position control system is used, wherein pulses are developed and fed into a shifting register for effecting movement of a machine member to a desired position, a transducer which develops a similar type of code would be used in lieu of the differential synchro 115.

Generally stated, the invention is not restricted to the mechanism shown but is intended to cover any equivalent corrective transducer which is actuated by means of a differential movement between the fixed length bar of temperature stable material and the temperature affected machine structure and to use the output of the transducer which is related to the temperature caused displacement to actuate the corrective motion in a machine sliding member.

From the foregoing detailed description of the illustrative embodiment set forth herein to exemplify the present invention, it will be apparent that there has been provided an improved automatically operable sensing and correcting device which is extremely accurate and relatively simple to construct and which is operable to sense the displacement of a machine element due to the expansion and contraction of the element as a result of temperature changes and which may be adapted for either automatic or manual correction to compensate for the displacement.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and the scope of the invention as defined in the subjoined claims.

The principles of this invention having now been fully explained in connection with the foregoing description, I hereby claim as my invention:

1. In a machine tool having an axially movable spindle head; a spindle carrying structure supported in the head; power means operably connected to actuate the head in its axial movement; a positioning control system operably connected to regulate the operation of the power means to effect accurate positioning of the spindle head; a bar member formed of a relatively temperature stable material carried by the spindle head for movement with it and for axial movement relative to it, said bar member having one end secured to the spindle carrying structure adjacent the nose portion of the spindle in a manner that displacement of the nose portion of the spindle from a reference position because of expansion and contraction of said spindle carrying structure as a result of temperature variations will effect an axial movement of said bar in an amount equal to the amount that the nose of the spindle is displaced; voltage producing means carried by the head and operably connected to the opposite end of said bar member to be actuated by the axial movement of said bar member; and voltage transmitting means operably connected to transmit the voltage from said voltage producing means to the positioning control system for modifying the control exercised by said positioning control system to thereby compensate for the displacement of the nose portion of the spindle; whereby a displacement in the nose of the spindle from a reference position will effect a movement of said bar member thereby causing said voltage producing means to produce a voltage which corresponds to the movement, and the voltage so produced will be transmitted to the positioning control system to impart a correction factor thereto so that the positioning control system will operate to effect a movement of the spindle carrying structure to a desired position.

2. In a machine tool having a power rotated spindle carrying member supported for axial movement; a separate power means operably connected to actuate the spindle carrying member in its axial movement; a positioning control mechanism operably connected to regulate said separate power means for effecting a positioning of the spindle carrying member; a bar of a relatively temperature stable material movably carried by the spindle carrying member and operably connected to the nose of the spindle in a manner to move with the nose of the spindle upon a displacement thereof from a reference position; a voltage producing means carried by the spindle carrying member in position to be operated by said movable bar so as to produce a voltage that varies in accordance with the movement of said bar; and means to transmit the voltage produced by said voltage producing means to the positioning control mechanism so as to modify its operation to correct for the displacement of the nose of the spindle; whereby a displacement of the nose of the spindle from an established position causes the bar to be moved a like amount thereby operating said voltage producing means to produce a voltage corresponding to the movement and such voltage is utilized to modify the operation of the positioning control mechanism to compensate for the amount of the displacement that has occurred.

3. In mechanism for sensing and compensating for the displacement of the operating end of a power actuated positionable component of a machine tool from a reference position wherein such displacement is due to temperature variations; a bar formed of a material which is relatively stable under temperature variations connected to the operating end of the component to move with it; a transducer carried by the machine tool in position to be actuated by the movement of said bar to produce an electrical voltage that varies in accordance with the movement; and means operably connected to said transducer and to the power acuator for the positionable component to receive the voltage from said transducer to effect operation of the power actuator for the positionable component to move the positionable component to compensate for the displacement of the operating end of the component from the reference position due to temperature variations.

4. In a position error sensing and compensating mechanism for the operating end of a movable member of a machine; a source of power; a drive connection supported by the movable member for connecting the power from said source for driving the movable member in its path of travel; a control circuit operably connected to regulate the operation of said power source for effecting a precise movement of the movable member to a desired position relative to a reference plane; programming means operably connected to actuate said control circuit for establishing a program of movements of the movable member; sensing means supported for movement with the movable member in its path of travel and connected to be actuatable for modifying the control exercised by said control circuit; and actuating means formed of a material having a relatively low coefficient of linear expansion connected to the operating end of the movable member and in engagement with said sensing means at a location that is in alignment with the location of said drive connection along the length of the movable member so that said actuating means functions to actuate said sensing means in response to the displacement of the operating end of the movable member due to the expansion and contraction of the movable member by reason of temperature variations; whereby said sensing means modifies the control exercised by said control circuit in response to said programming means to compensate for the displacement of the operating end of the movable member as a result of temperature variations.

5. In a position error sensing and compensating mechanism for the operating end of a movable member of a machine; a source of power operably connected to move the member in its path of travel; control means operably connected to regulate the operation of said power source for effecting a precise movement of the movable member to a desired position relative to a reference plane; programming means operably connected to actuate said control means for establishing a program of movements of the movable member; sensing means supported for movement with the movable member in its path of travel and connected to be actuatable for modifying the control exercised by said control means; and a bar formed of a material having a relatively low coefficient of linear expansion connected at one of its ends to the operating end of the movable member and having its opposite end engaged with said sensing means so that axial movement of said bar actuates said sensing means; whereby displacement of the operating end of the movable member because of the expansion and contraction of the movable member due to temperature variations will produce an axial movement of said bar to actuate said sensing means for modifying the control exercised by said control means in response to said programming means to compensate for the displacement of the operating end of the movable member as a result of temperature variations.

6. In a machine tool; a base; a frame movably supported by said base; a member carried by said frame for movement therewith, said member having an operating end; a source of power connected to move said frame in its path of travel; a source of command signals connected to transmit information indicating the movement of the operating end of said member from a reference plane; a control circuit operably connected to regulate the operation of said power source in response to the command signals for moving said member to the position indicated by the command signals; electrical sensing means supported by said frame and connected to transmit a variable electrical signal to said control circuit for modifying the control established by said command signals; and a bar formed of a material having a relatively low coefficient of linear expansion secured at one end to the operating end of said member and having its opposite end in engagement with said sensing means so that axial movement of said bar actuates said sensing means for varying the electrical signal transmitted by said sensing means; whereby the displacement of the operating end of said member from the reference plane by reason of the expansion and contraction of said member due to temperature variations produces an axial movement of said bar to actuate said sensing means for modifying the control exercised by said control circuit to compensate for such displacement of the operating end of said member from a reference plane.

7. In a machine tool; a base; a tool supporting member carried by said base and having an operating end; a work supporting table carried by said base for supporting a workpiece; a source of power operably connected to effect relative movement between said tool supporting member and said work supporting table for positioning the tool and the workpiece relative to each other; control means operably connected to regulate the operation of said power source for effecting a precise positioning movement; a transducer supported by said frame and operably connected to modify the operation of said control means when actuated; and a bar formed of a material having a relatively low coefficient of linear expansion and having one end attached to the operating end of said machine member and its opposite end attached to said transducer so that a displacement of the operating end of said machine member due to its expansion and contraction resulting from temperature variations will cause an axial movement of said bar to actuate said transducer for modifying the operation of said control means to compensate for the amount of such displacement of the operating end of said machine member.

8. In a position error sensing and compensating mechanism for the operating end of a movable member of a machine; a source of power operably connected to move the member in its path of travel; control means operably connected to regulate the operation of said power source for effecting a precise movement of the movable member to a desired position relative to a reference plane; programming means operably connected to actuate said control means for establishing a program of movements of the movable member; sensing means operably connected to regulate said control means for effecting the positioning of the movable member as directed by said programming means; and a bar formed of a material having a relatively low coefficient of linear expansion connected at one of its ends to the operating end of the movable member and having its opposite end connected to actuate said sensing means in response to axial movement of said bar; whereby displacement of the operating end of the movable member because of the expansion and contraction of the movable member due to temperature variations will produce an axial movement of said bar to actuate said sensing means for regulating said control means to compensate for the displacement of the operating end of the movable member as a result of temperature variations.

9. In a position error sensing and compensating mechanism for the operating end of a movable member of a machine; a source of power operably connected to move the member in its path of travel; a bar formed of a material having a relatively low coefficient of linear expansion connected at one of its ends to the operating end of the movable member and extending therefrom in a path parallel to the path of travel of the movable member; and control means actuatable to regulate the operation of said power source for effecting a precise movement of the movable member to a desired position and connected to be actuated by the extending end of said bar in response to the axial movement of said bar; whereby displacement of the operating end of the movable member because of the expansion and contraction of the movable member due to temperature variations will produce an axial movement of said bar to actuate said control means to compensate for the displacement of the operating end of the movable member as a result of temperature variations.

10. In a machine tool having a tool carrying member and a workpiece carrying member mounted for relative movement to effect a desired relationship between the workpiece and the tool; a source of power connected to effect relative movement between the tool carrying member and the workpiece carrying member; control means operably connected to regulate the operation of said power source for effecting precise relative movement with the movement effected being in respect to a reference plane; programming means operably connected to actuate said control means for establishing a program of movements; sensing means carried by the tool carrying member and connected to be actuatable for modifying the control exercised by said control means; and a bar formed of a material having a relatively low coefficient of linear expansion connected at one of its ends to the tool carrying end of the tool carrying member and having its opposite end engaged with said sensing means so that axial movement of said bar actuates said sensing means; whereby displacement of the tool carrying end of the tool carrying member because of the expansion and contraction of the tool carrying member due to temperature variations will produce an axial movement of said bar to actuate said sensing means for modifying the control exercised by said control means in response to said programming means to compensate for the displacement of the tool carrying end of the tool carrying member as a result of temperature variations.

11. In mechanism for sensing and compensating for the displacement of the operating end of a power actuated positionable component of a machine tool from a reference position wherein such displacement is due to temperature variations; a bar formed of a material having a relatively low coefficient of linear expansion connected to the operating end of the component to move with it; a linear transducer carried by the machine tool in position to be actuated by the movement of said bar to produce an electrical voltage that varies in accordance with the movement; and means operably connected to said linear transducer and to the power actuator for the positionable component to receive the voltage from said linear transducer to effect operation of the power actuator for the positionable component to compensate for the displacement of the operating end of the component from the reference position due to temperature variations.

12. In a machine tool having a spindle carrying movable member; power means operably connected to actuate said member in its path of travel; a positioning control system operably connected to actuate said power means, said positioning control system being operably connected to receive a command input to effect operation of said power means for moving the spindle carrying member to a desired position; a bar of fixed length movably carried by said spindle carrying member and having one end connected to said spindle carrying member adjacent the operating end of the spindle carried thereby so that a displacement of the operating end of the spindle from an established position will cause said bar to move a corresponding amount; a linear transducer carried by said spindle carrying member in position to be actuated by the movement of said bar, said linear transducer being operable when actuated by the movement of said bar to produce a voltage which varies in accordance with the movement; and means operably connected to transmit the voltage produced by said linear transducer to said positioning control system to modify the control effected by said positioning control system and thereby compensate for the distance that the operating end of the spindle was displaced from an established position so that said spindle carrying member will be located in the precise desired position.

13. In a mechanism for sensing the displacement of a member resulting from its expansion and contraction; a base; a machine member carried for movement relative to said base and having an operating end; sensing means supported for movement with said member and arranged in alignment with a reference point thereon for sensing the displacement of the operating end of said machine member relative to said reference point; and actuating means formed of a material having a relatively low coefficient of linear expansion, said actuating means being connected to the operating end of said member and coacting with said sensing means to actuate said sensing means in response to the displacement of the operating end of said member relative to said reference point and resulting from the expansion and contraction of said member by reason of temperature variations.

14. In a mechanism for sensing the displacement of a member resulting from its expansion and contraction; a base; a machine member carried for movement relative to said base and having an operating end; indicating means supported for movement with said member and arranged in alignment with a reference point thereon for indicating the displacement of the operating end of said machine member relative to said reference point; and actuating means formed of a material having a relatively low coefficient of linear expansion, said actuating means being connected to the operating end of said member and coacting with said indicating means to actuate said indicating means in response to the displacement of the operating end of said member relative to said reference point and resulting from the expansion and contraction of said member by reason of temperature variations.

15. A precision positioning mechanism comprising, a movable member, positioning control mechanism operably connected to effect positioning of said member, a bar of fixed length movably carried by said member and having one end connected thereto, said bar being of a material which is relatively stable under temperature variations so that a displacement of the operating end of said movable member from an established position will cause said bar to move a corresponding amount, voltage producing means positioned for operation by said bar so as to produce a voltage which varies in accordance with the movement of said bar, and means operably connected to transmit the voltage produced by said voltage producing means to said positioning control mechanism to modify the control effected thereby and thus compensate for the distance that the operating end of the movable member was displaced.

References Cited in the file of this patent

UNITED STATES PATENTS

| | | |
|---|---|---|
| 2,664,787 | Plimmer | Jan. 5, 1954 |
| 2,956,344 | Rantsch | Oct. 18, 1960 |

FOREIGN PATENTS

| | | |
|---|---|---|
| 1,027,211 | France | Feb. 11, 1953 |